R. L. NELSON.
Improvement in Corn Harvesters.
No. 115,978.  Patented June 13, 1871.
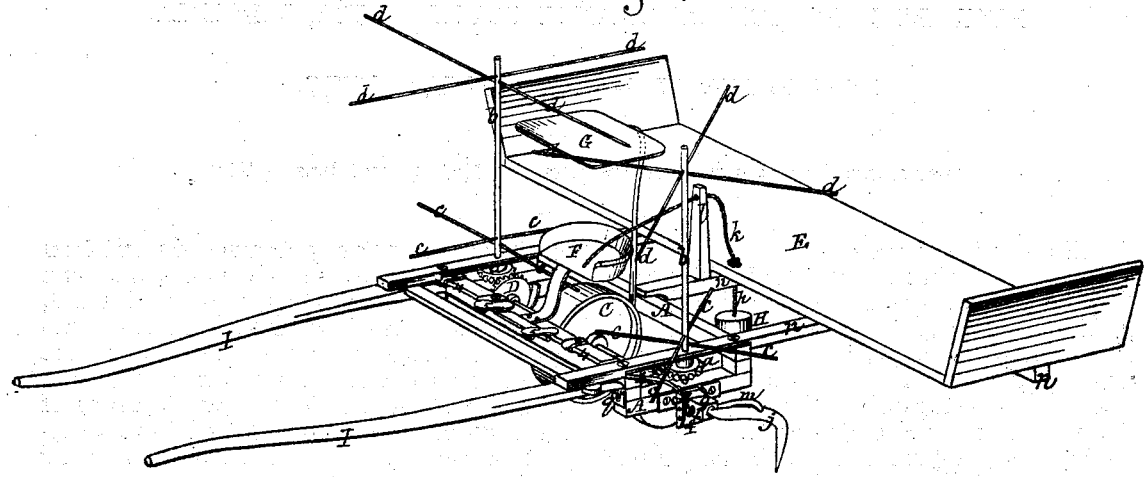
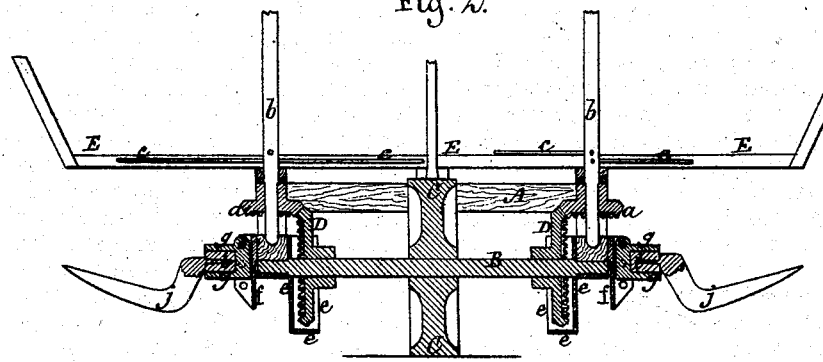
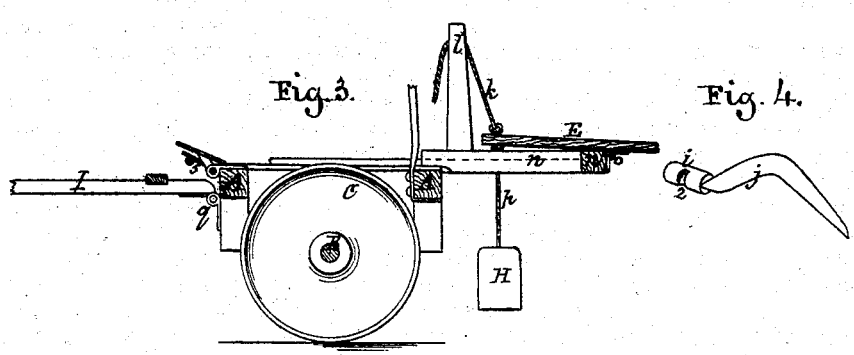 
Witnesses.
Edmund Masson.
Richard L. Nelson.
By atty A. B. Stoughton.

UNITED STATES PATENT OFFICE.

RICHARD L. NELSON, OF ORANGE COURT HOUSE, VIRGINIA.

IMPROVEMENT IN CORN-HARVESTERS.

Specification forming part of Letters Patent No. 115,978, dated June 13, 1871.

*To all whom it may concern:*

Be it known that I, RICHARD L. NELSON, of Orange Court House, in the county of Orange and State of Virginia, have invented certain new and useful Improvements in Machines for Cutting Corn-Stalks, Sugar-Cane, &c.; and that the following is a full, clear, and exact description of the same, reference being had to the accompanying drawing making a part of this specification, in which—

Figure 1 represents a perspective view of the machine. Fig. 2 represents a vertical cross-section through the same in the plane of the driving and supporting axle. Fig. 3 represents a fore-and-aft section through the main frame and main axle. Fig. 4 represents, in perspective, one of the reaping hooks or sickles detached from its socket.

Similar letters of reference, where they occur in the separate figures, denote like parts of the machine in the drawing.

My invention relates to certain improvements in machines for cutting, gathering, and dumping in bundles stalks, canes, and other similar articles, whereby the machine is made more efficient for that purpose, and more under the control of the operator, in being adapted for higher or lower cutting, and for passing obstructions without damage to any of its parts.

To enable others skilled in the art to make and use my invention, I will proceed to describe the same with reference to the drawing.

The main frame A is supported upon a main axle, B, which in turn is supported on a main wheel, C, with which it revolves, this main wheel C being the supporting and driving wheel both. Near the outer ends of the axle B, but inside of the main frame, there are arranged two bevel-gear wheels, D, each of which gears into and turns a bevel-pinion, $a$, on the vertical reel-shafts $b$, and thus gives motion to said reel-shafts. On these reel-shafts $b$ there are two sets of reel-arms, $c\,d$, one set near their lower and the other set near their upper ends, so that the stalks to be cut may be caught at two points—viz., higher up and lower down—in which condition they are not only more readily severed but more uniformly held and carried to and delivered upon the truck E. The bevel-gears D run quite close to the ground, and prevent them from being injured by coming in contact with any obstructions, and from winding up weeds, straws, stalks, &c., and thus clogging their action, they are shielded, as at $e$. The reel-shaft $b$ stands in a plane vertical to the axis of the main axle B, and the power is transmitted directly from the main axle to said shafts through or by means of these bevel-gears. The shafts $b$ have a support or bearing both above and below their bevel-pinions, and so revolve very steadily and without cramping or cutting the gears; and as the main frame vibrates upon the main axle as a center, the gears can roll one against the other without any binding. To the outer ends of the main frame, in line with the main axle B, and in suitable brackets or supports $f\,f$ attached to said frame, are pivoted or hinged the sickle-holders $g\,g$, which are adjustable vertically in their supports $f$. Into recesses or sockets in these sickle-holders the shanks $i\,i$ of the sickles $j$ are set and held by a set-screw, 1, the point of which takes into a slot, 2, cut in the shanks $i$, so that the sickles may have a turning motion in the sockets but still be held to their sockets. There is also connected with each sickle-holder $g$ a spring, $m$, the point of which bears upon the sickle $j$, and is designed for forcing down the sickle should it be raised up by any obstruction which it could not cut. To the sickle-holders are connected links 3, which, at their other ends, unite with a crank or bent rod, 4, having on it a foot-lever, 5, so that the driver or operator on his seat F may raise up one or both of the sickles to pass obstructions of any kind, and let them down again at pleasure. Over the driver's seat is a canopy, G, to shield the head of the occupant of the seat from the arms $d$ of the reels, which rotate over said canopy. From the main frame A there is extended rearward a second frame, $n$, or it may be a prolongation of the main frame, to which is hinged, at $o$, the stalk-receiver and carrier E, to the forward part of which there is attached a rope or cord, $k$, which passes through a post, $l$, set on or in the frame $n$, and which cord the driver may seize at any time, and, raising up the front of the stalk-box or platform, dump its contents upon the ground. Underneath the front portion of the receiving-box E there is suspended, by a cord or chain, $p$, a weight, H, which, when the carrier or platform E is dumped, returns said platform again to its receiving position. The shafts I are hinged to the front of the main frame A, as at $q$, so as to admit of the main frames rocking on its main axle. The carrying-wheel C, if a single wheel, should be broad enough on its tread to prevent the machine from rocking too much laterally. If narrow tread-wheels are preferred, then two should be used, a little remote from the central line of the machine.

Dispensing with truck-wheels on the dumping-platform avoids the draft due to such wheels, and diminishes the expense of construction. The obliquity or angles of the cutting-edges of the sickles are such as to give a draw-cut on the stalks whether they are caught at the point or heel of the cutting-edge. The arrangement of the main axle, carrying-wheel, bevel-gears, reel-shafts, and sickle-sockets, all in the same or substantially the same vertical plane, makes their motions easy and direct from the first moving power, admits of compactness of structure, and allows the driver in his seat to observe and attend to all their operations. The main frame, too, may vibrate fore and aft on the axle without interfering with the true meshing of the bevel-gears, as the pinions will roll in the bevel-wheels D without cramping or running out of gear.

Having thus fully described my invention, what I claim is—

1. The combination of the brackets $f$, adjustable hinged sockets $g$, and round shank $i$, and slot 2 on the sickles, as and for the purpose described.

2. In combination with the adjustable socket $g$, hinged and capable of being raised and lowered by the foot-treadles 5 and their connections, and with the sickle-shank having a turning motion in said socket, the bearing-spring $m$ for allowing the sickles to rise to pass any obstruction, and be returned again after passing it, as described and represented.

RICHARD L. NELSON.

Witnesses:
 A. B. STOUGHTON,
 EDMUND MASSON.